US006601693B2

(12) United States Patent
Horton et al.

(10) Patent No.: US 6,601,693 B2
(45) Date of Patent: Aug. 5, 2003

(54) BELT CONVEYOR WITH A SURFACE LAYER TRANSFERRED ONTO THE ARTICLE-CONVEYING SURFACE AND METHOD THEREFOR

(75) Inventors: Paul L. Horton, Metairie, LA (US); David W. Bogle, Destrehan, LA (US)

(73) Assignee: The Laitram Corporation, Harahan, LA (US)

( * ) Notice: Subject to any disclaimer, the term of this patent is extended or adjusted under 35 U.S.C. 154(b) by 156 days.

(21) Appl. No.: 09/760,530

(22) Filed: Jan. 16, 2001

(65) Prior Publication Data

US 2002/0092730 A1 Jul. 18, 2002

(51) Int. Cl.[7] .............................................. B65G 13/02
(52) U.S. Cl. ................................... 198/688.1; 198/850
(58) Field of Search .............................. 198/688.1, 500, 198/580

(56) References Cited

U.S. PATENT DOCUMENTS

| | | | | |
|---|---|---|---|---|
| 4,258,779 A | * | 3/1981 | Musschoot | 198/580 X |
| 4,459,254 A | * | 7/1984 | Zuber | 198/500 X |
| 4,488,634 A | * | 12/1984 | West | 198/688.1 X |
| 5,247,957 A | | 9/1993 | Weisse | |
| 5,613,594 A | | 3/1997 | Kootsouradis | |
| 5,931,457 A | * | 8/1999 | Todoki | 198/688.1 X |
| 6,071,354 A | * | 6/2000 | Williams | 198/500 X |
| 6,302,263 B1 | * | 10/2001 | Bennett et al. | 198/500 X |
| 2002/0108838 A1 | | 8/2002 | Olson et al. | |

\* cited by examiner

Primary Examiner—James R. Bidwell
(74) Attorney, Agent, or Firm—James T. Cronvich

(57) ABSTRACT

A belt conveyor with a surface layer transferred onto its article-carrying or other surface to impart certain effective properties to the surface. The belt conveyor comprises a conveyor belt driven by a belt drive along a belt-conveying path. A transfer element transfers a coating material to a belt surface along a section of the belt-conveying path. Metallic bearing surfaces in contact with the belt surface act as transfer elements from which an oxidizable metal is rubbed by the relative motion of the belt to form a high-friction metallic oxide layer on the belt surface. Another transfer element is realized by an applicator with a reservoir for storing a coating material. The applicator is positioned close to the belt surface to dispense a layer of coating material with properties that mask the inherent surface properties of the belt. In yet another version, the conveyed articles themselves serve as transfer elements.

25 Claims, 5 Drawing Sheets

BELT CONVEYOR WITH A SURFACE LAYER TRANSFERRED ONTO THE ARTICLE-CONVEYING SURFACE AND METHOD THEREFOR

BACKGROUND

This invention relates generally to belt, or chain, conveyors for transporting articles on an article-conveying surface and, more particularly, to changing the surface characteristics of the article-conveying surface of such a belt or chain.

Plastic conveyor belts, or chains, are used widely in the food-processing industries to convey food products. In the beverage industry, for instance, belts are used to convey bottles. In certain applications, bottles must be conveyed up an inclined path. Because of the inherent slickness of most plastic belt materials, the slope of the incline must be limited lest the bottles slip on the slick conveying surface of the belt. For some plastic belt materials, such as acetal, the maximum slope may be limited to only a few degrees off horizontal. Flights or buckets are used in some applications to convey products uphill, but they form barriers on the conveying surface that are unacceptable in other applications. High-friction rubber-like materials inserted into or directly molded onto the slick plastic conveying surface are especially effective in transporting packages up steep inclines, but would impede the rapid transfer of bottles between belts required in many beverage applications. Thus, there is a need for a belt conveyor that provides just enough friction on its article-conveying surface to convey articles up shallow inclines without slippage and yet not so much friction that the rapid transfer of articles to and from the conveying surface is impeded.

In other applications, other belt surface properties are desirable. Properties such as low-friction, electrical conductivity, and non-stick, are typically achieved by manually applying materials having the desired property directly on the belt surface or by compounding appropriate materials into a plastic resin before molding a belt module. The manual application and re-application of these materials as they are used up can be messy and time-consuming. While molding belt modules out of certain materials may give the desired benefits, there can be unwanted side-effects, such as brittle or weak belt structure, caused by the incorporation of the materials having the desired characteristics. Thus, there is a further need for transferring a variety of surface characteristics to a belt surface.

SUMMARY OF THE INVENTION

These needs and others are satisfied by a belt conveyor having features of the invention. The preferred conveyor includes a plastic conveyor belt, driven by a belt drive, and a transfer element disposed close to a surface of the belt. The transfer element transfers coating material to the surface of the belt along a section of the belt-conveying path. The transferred material has properties that change the effective surface characteristics of the belt. As the belt is driven past the transfer element, the coating material is transferred onto the belt surface, thereby changing its effective properties.

In one version of the conveyor, the transfer element is an applicator that includes a reservoir for the coating material. The reservoir is preferably easy to replenish.

Another version of a conveyor includes, as a transfer element, a bearing element with a bearing surface made of an oxidizable metal. The bearing element bears against the slick article-conveying surface of the belt along a section of the belt-conveying path. As the belt is driven past the bearing element, the oxidizable metal on the bearing surface is transferred onto the article-conveying surface of the belt. The transferred metal, which soon oxidizes, forms an oxide layer atop the article-conveying surface. The oxide layer exhibits increased friction compared with the slick plastic of the belt. In this way, the invention provides a belt and a conveyor system with just enough friction to transport bottles up modest inclines without also impeding the rapid transfer of bottles across the article-conveying surface. Thus, the objective of providing a belt with generally desirable low-friction characteristics with a slight amount of friction only on the articleconveying surface to prevent conveyed articles from slipping is achieved.

In a preferred version of the invention, the metal constituting the bearing surface is selected from the group consisting of aluminum, stainless steel, and carbon steel. Of these, aluminum is most preferred because of its relative softness, ready oxidation in typical environments, inexpensive cost, and ready availability. In other versions of the invention, the bearing element can be stationary, weighted down against the articleconveying surface by weights, and disposed at a position on the belt-conveying path where articles are not on the belt.

In yet another version of the invention, surface properties are transferred to the article-conveying surface of the belt by the conveyed articles themselves after contact with a source of the preselected material.

In a method according to the invention, the friction of a belt's conveying surface is increased by positioning a bearing element with a bearing surface made of an oxidizable metal in contact with the conveying surface of a conveyor belt. The conveyor belt and the bearing element in contact are moved relative to each other. The relative motion transfers the oxidizable metal from the bearing surface to the article-conveying surface, thereby increasing the friction with conveyed articles.

In another version, a method is provided for forming a thin layer of a preselected coating material on a surface of a conveyor belt. Because the transfer element is positioned close to the belt surface, the coating material fed from the transfer element is transferred by rubbing as a thin layer on the belt surface. Materials are selected to provide surface characteristics different from those of an unlayered surface. The material can even be replenished as it is spent. Thus, surface characteristics other than increased friction can be simply imparted to a conveyor belt to handle a variety of applications.

BRIEF DESCRIPTION OF THE DRAWINGS

These and other features, aspects, and advantages of the invention are further addressed in the following description, appended claims, and accompanying drawings, in which:

DETAILED DESCRIPTION

Figure 1:
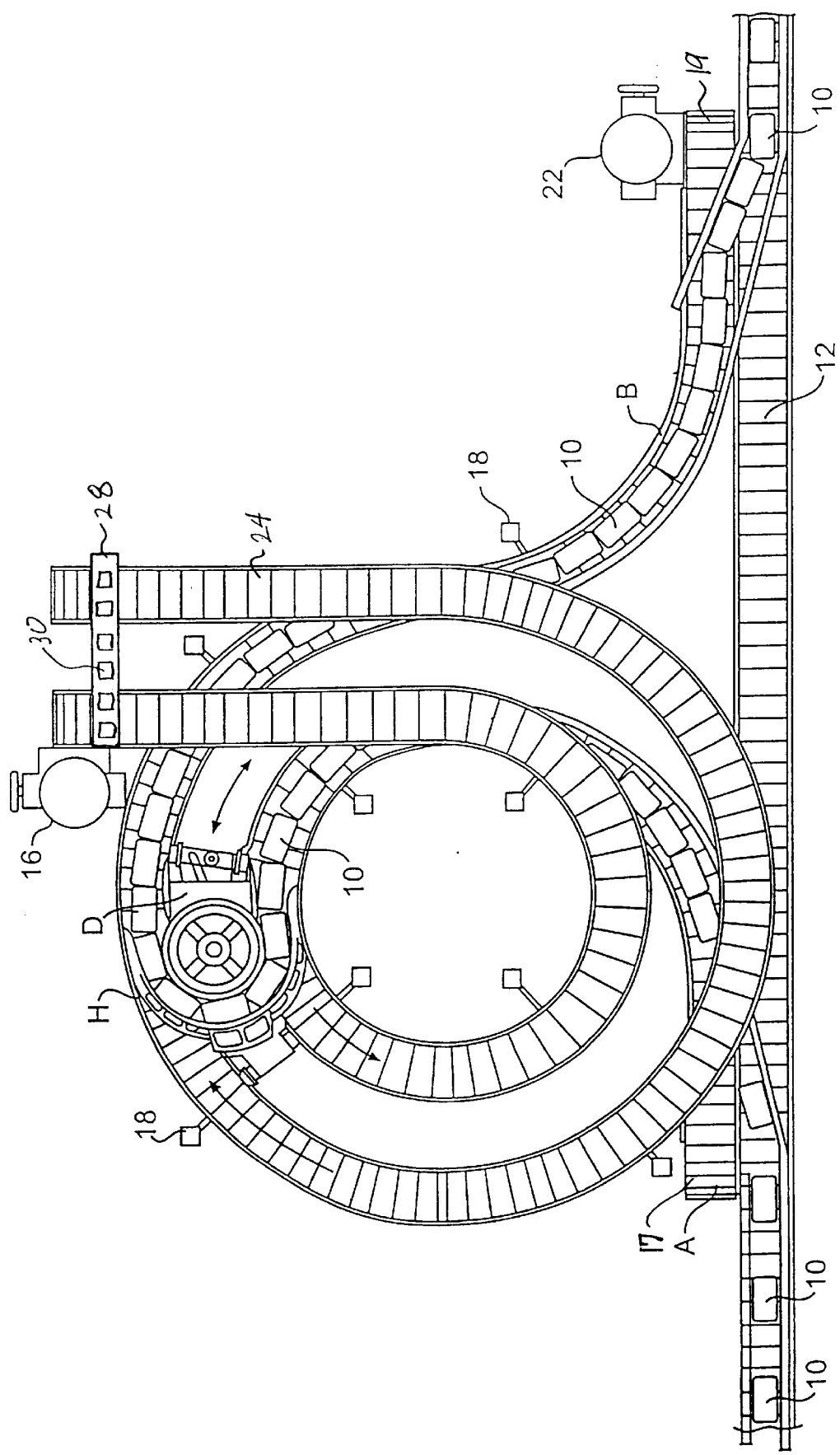
FIG. 1 is a top plan view of a belt conveyor having features of the invention in a spiral accumulator application.

FIG. 1 shows a belt conveyor embodying features of the invention. Articles 10 are carried along a straight section of a conveyor belt 12 from an input end at the left to an output end at the right. A spiral accumulator 13, such as the DYNAC Accumulator manufactured by Hartness International of Greenville, South Carolina, is associated with the straight conveyor belt 12 in such a way as to act as a first-in, first-out (FIFO) accumulator to accommodate different rates of upstream and downstream processing of the articles. The spiral accumulator 13 is a belt conveyor system comprising a first endless belt A (the infeed belt) arranged in a single-loop helix paralleled along most of its length by a second endless belt B (the outfeed belt). Infeed belt A is driven counterclockwise as indicated by the arrow by a drive including a motor 16 coupled to sprockets (not shown) at the upper end of the belt-conveying path. (The belt-conveying path is defined as the entire path the belt takes, including the carryway, the returnway, and the path around the sprockets or pulleys.) Belt A is also engaged by sprockets (not shown) at its input end 17. Outfeed belt B is driven in the direction of the clockwise arrow by a similar drive 22 positioned at the lower output end 19 of the helical belt-conveying path. Idler sprockets (not shown) entrain belt B at its top end. The two-belt spiral accumulator is supported by a framework on legs 18.

Spanning the gap between the belts A and B is a transfer mechanism D commonly known as a spider. A curved sweep rail H affixed to the spider directs articles from the infeed belt A to the outfeed Belt B. Depending on the relative speed of belts A and B, which are controlled by an intelligent controller to match the rates of upstream and downstream processes, the spider moves back and forth along the two belts as indicated by the two-headed arrow. Articles are guided from the straight conveyor belt 12 onto infeed belt A at the input end 17, across the spider, onto outfeed belt B, and back onto the straight belt 12 at the output end 19 of belt B. The spiral accumulator allows articles to be accumulated along the conveying surfaces of belts A and B in a guaranteed first-in/first-out order.

The accumulator is arranged in a spiral to minimize its footprint and take up less floor space. The spiral arrangement requires that both belts A and B negotiate a change in elevation. Articles on belt A go up an incline, and articles on belt B descend. The belts are constructed of modules 24, such as those shown in FIG. 2. The modules are typically injection-molded out of a thermoplastic polymeric material, such as polypropylene, polyethylene, polyester, and acetal. All these materials are generally slick for low-friction contact with the drive elements, such as sprockets, and with supporting wearstrips. The slick material also allows for smooth transfer of articles from belt to belt. The article-conveying surface 26 of the belt generally has enough friction to convey articles along a level conveying path. With some articles, however, even a slight slope of a couple of degrees off horizontal, such as in a spiral accumulator, can cause the articles to slip and slide down the conveyor under the influence of gravity. For this reason, the spiral accumulator in FIG. 1 includes a transfer element, such as a bearing element 28 weighted down by weights 30 in contact with the conveying surfaces 26 of the belts A and B. The bearing element shown in FIG. 1 is disposed at a section of the belt-conveying path where articles do not ride. In other applications, the bearing element could take the form of a shoe, for example, tensioned against the article-conveying surface on the underneath belt returuway path to avoid interfering with conveyed articles. Preferably, the bearing element is stationary with the belt running past. But, the important thing is that there be relative motion between the belt and the bearing element to effect a rubbing of the conveying surface of the belt against a bearing surface 32 (in FIG. 2) of the bearing element.

Figure 2:
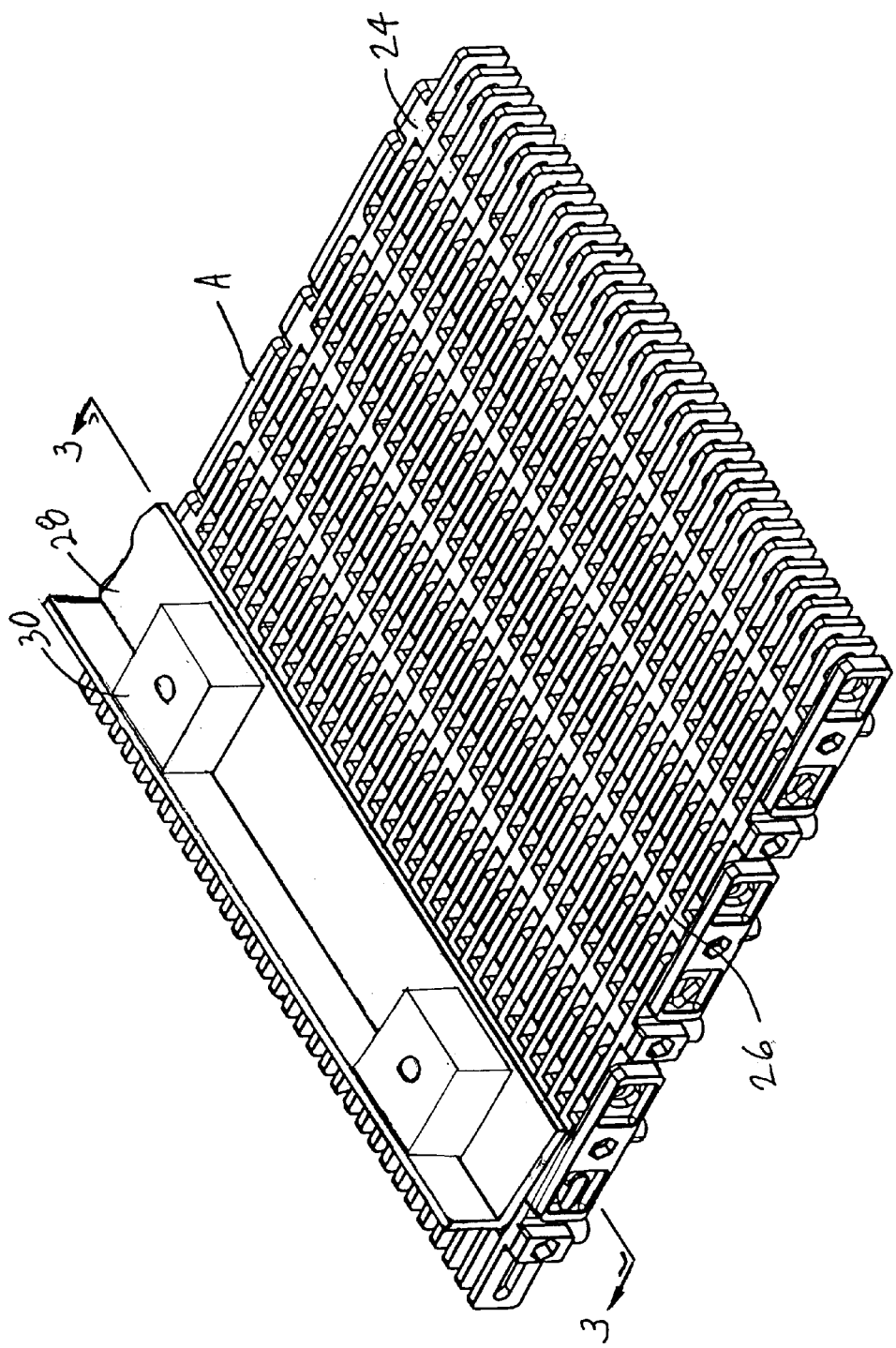
FIG. 2 is an isometric view of a portion of the belt in the belt conveyor of FIG. 1.
Figure 3:
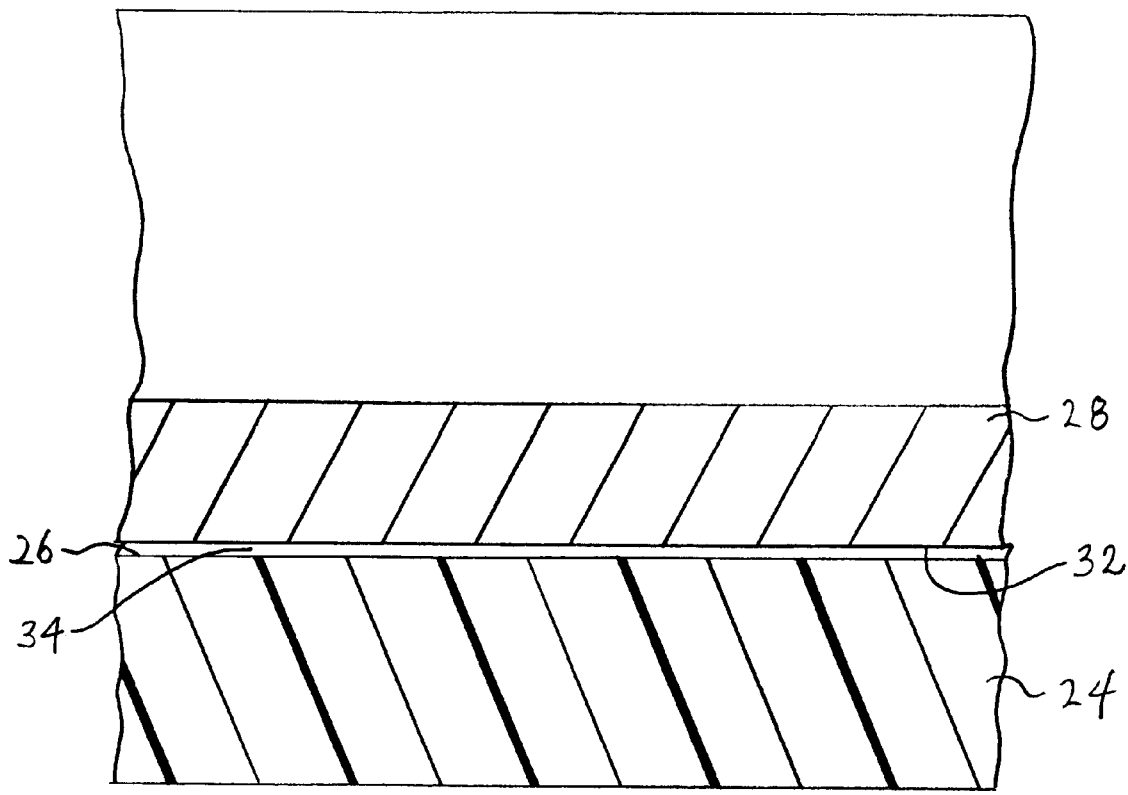
FIG. 3 is a partial enlarged sectional view along the cut line 3—3 of FIG. 2.

As shown in FIG. 2, the bearing element 28 includes a bearing surface 32 that bears against the conveying surface 26 of the belt modules 24 along a section of the belt-conveying path. The bearing surface is preferably made of a metal, such as aluminum, stainless steel, and carbon steel. Aluminum is attractive because of its relative softness, oxidizability, low cost, and availability. As the conveying surface of the belt rubs against the bearing surface of the bearing element, oxidizable metal is transferred from the bearing surface to the conveying surface as a thin layer 34 of the oxidized metal atop the conveying surface. As the metal oxidizes, the oxide layer exhibits higher friction (i.e., a greater coefficient of friction) than the slick, covered conveying surface itself. Although the increase in friction is not great, it is enough to allow steeper inclines without article slippage.

Stainless steel and other metals that do not rapidly oxidize are also effective in increasing the friction of the conveying surface. The unoxidized metal transferred to the conveying surface as a thin metallic layer exhibits higher friction than the slick plastic belt material.

Preferable materials for the bearing surface and their properties include, for example:

a) aluminum—high-friction aluminum oxide layer; relative softness b) stainless steel—lower friction than aluminum; slow wear c) carbon steel—high friction.

To achieve other surface characteristics, the bearing surface could be made of the following materials, which have the associated characteristics:

a) graphite—electrically conductive; low friction b) copper or tin—anti-fouling in damp or underwater environments c) non-oxidizable metals—electrically conductive.

Figure 4:
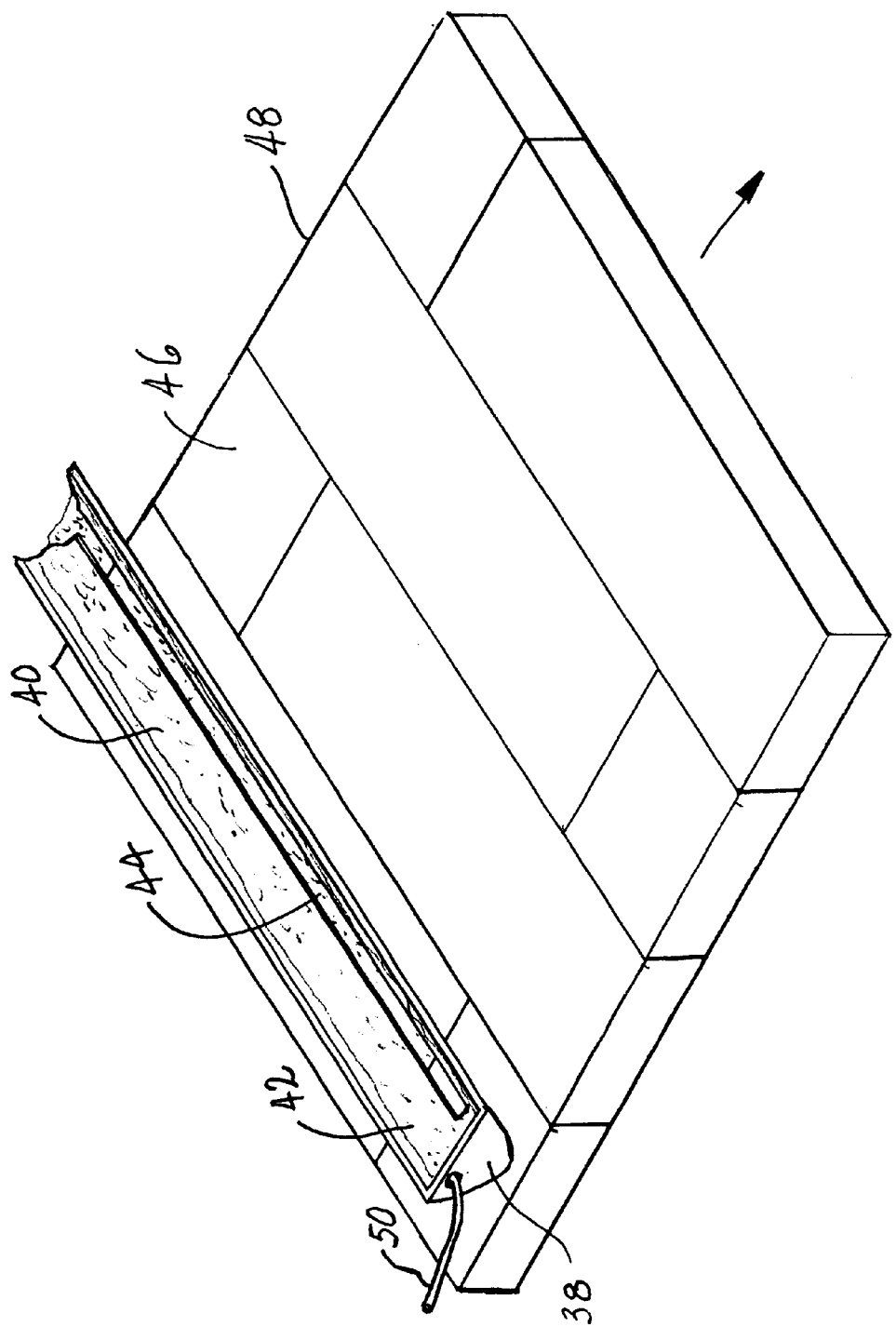
FIG. 4 is an isometric view of a portion of another version of conveyor having features of the invention.

Another version of conveyor embodying features of the invention is shown in FIG. 4, in which the transfer element is in the form of an applicator 38 having a reservoir 40 to hold a coating material 42. The applicator has an opening 44—in this example, a long slot at the bottom of a trough-shaped applicator. The slot is disposed just above a surface 46—in this case, a top conveying surface—of a belt 48. As the belt is driven past the transfer element, or applicator, the coating material dispensed through the slot is rubbed onto the surface of the belt as a layer. As the coating material is depleted, it can be replenished through, for example, a tube 50 opening into the reservoir. Gravity urges the coating material to the slot at the bottom of the trough-shaped dispenser in this version. Of course, more elaborate dispensing systems, including, for example, rollers, could be used to ensure a well-managed application of coating material to the surface to be layered. The dispenser-type transfer element is particularly useful in transferring powders, emulsions, greases, and viscous liquids to a surface. In this way, materials such as lard with its non-stick properties or graphite powder with its electrically conductive or lubricating properties can be applied to a surface to replace its inherent properties.

Figure 5:
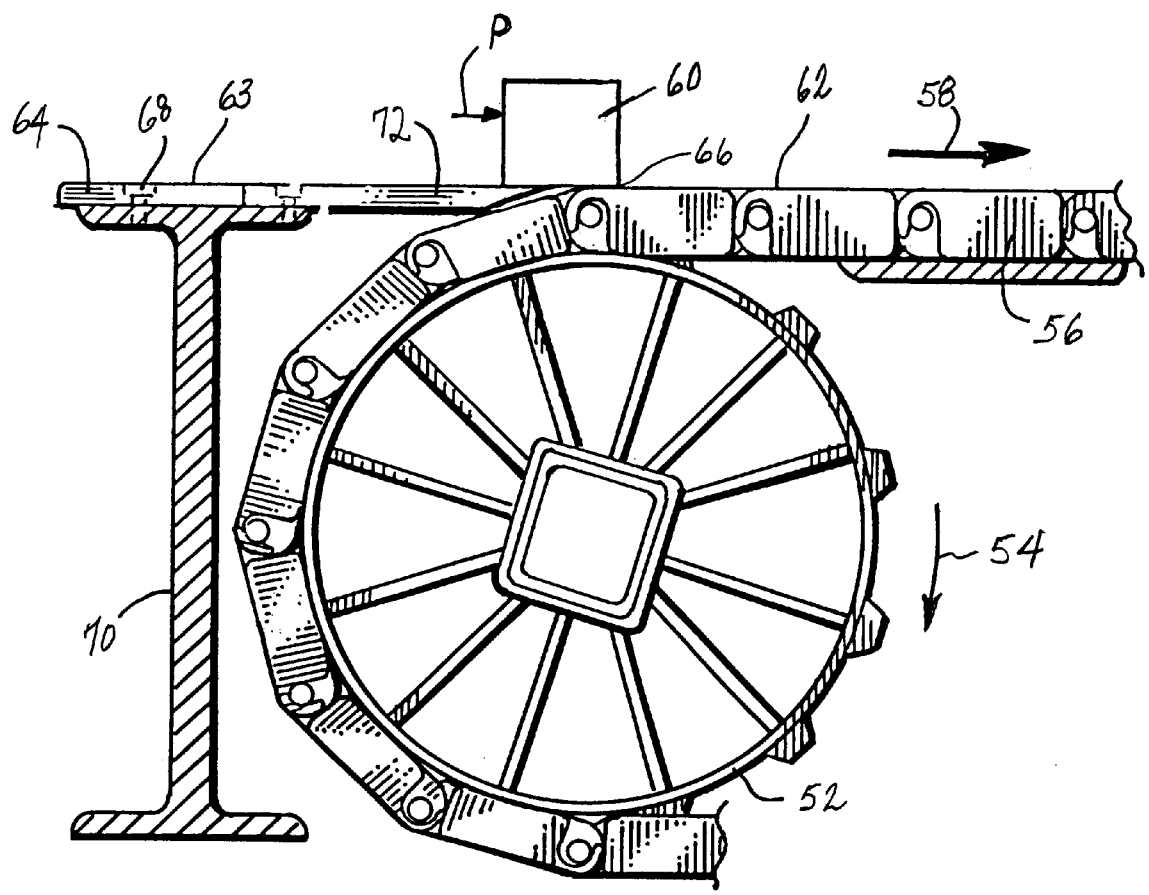
FIG. 5 is a side elevation view of a portion of yet another version of conveyor having features of the invention.

Still another version of conveyor embodying features of the invention is shown in FIG. 5, in which the conveyed articles themselves transfer a surface material to the belt-conveying surface. A sprocket 52 rotated in the direction of arrow 54 by a belt drive drives a belt 56 in the direction of arrow 58. Articles 60 to be conveyed on the articleconveying surface 62 of the belt are pushed onto the belt by a force P, typically the force of a mass of trailing articles. Material to be transferred to the article-conveying surface of the belt is, in this example, rubbed from the top surface 63 of a plate 64 made of the material onto the undersides 66 of the articles as they slide past. Over time, as the plate wears, it can be replaced. Screws or bolts 68 retain the plate in place on a support 70. A transfer plate 72, also attached to the support by bolts or screws, is positioned close to the belt near its exit from the sprocket for a smooth transfer of articles to the belt. The top surface of the transfer plate is generally coplanar with the top surface 63 of the plate 64 made of the material to be transferred to the article-conveying surface of the belt. As this example shows, conveyed articles can serve as transfer elements with the bottom surfaces acting as bearing elements. Of course, there are many ways of transferring articles onto belts and many ways of realizing the functions of the plate 64 as a source of the desired material to be transferred to an article. In addition to the rubbing contact of articles against a static plate, other ways include, for example, dispensers, such as sprayers or rollers, that deposit the desired material on the article before it is transferred onto the belt.

Although the invention has been described in detail with respect to certain versions, other versions are possible. For example, belt surfaces other than conveying surfaces can be treated. The underside could be coated with a low-friction coating material for low-friction engagement with supporting wear surfaces in the conveyor frame. In addition to the metal oxides, lard, and low-friction graphite mentioned, other powders, wet lubricants, greases, electrically conductive materials, paints, primers, anticorrosion materials, and antibacterial creams are examples ofjust some of the possible materials that can be transferred to a conveyor belt in a similar way. Furthermore, as the bearing surface wears or its material is spent, the bearing surface can easily be replaced and the material replenished. As these examples suggest, the spirit and scope of the claims are not limited to the preferred versions described in detail.

What is claimed is:

1. A method for increasing the friction of the conveying surface of a plastic conveyor belt, the method comprising:
   positioning a bearing element with a bearing surface comprising an oxidizable metal in contact with the conveying surface of a plastic conveyor belt along a section of a belt-conveying path;
   causing relative motion between the conveyor belt and the bearing element; and
   transferring oxidizable metal from the bearing surface to the conveying surface by the relative motion of the conveyor belt and the bearing element in contact with the conveying surface to form on the conveying surface a thin layer of oxidized metal exhibiting increased frictional characteristics.

2. The method of claim 1 wherein the oxidizable metal is aluminum.

3. The method of claim 1 wherein the relative motion between the conveyor belt and the bearing element is caused by driving the conveyor belt past the stationary bearing element.

4. A plastic conveyor belt, comprising an article-conveying surface formed of a slick plastic material topped with a thin layer of oxidized metal to increase the friction between the otherwise slick article-conveying surface and articles conveyed thereon.

5. A plastic conveyor belt as in claim 4 wherein the oxidized metal is selected from the group consisting of aluminum, stainless steel, and carbon steel.

6. A plastic conveyor belt as in claim 4 wherein the thin layer of oxidized metal is transferred to the article-conveying surface by rubbing.

7. A conveyor for transporting articles along a carryway portion of a belt-conveying path, comprising:
   a plastic conveyor belt having an article-conveying surface formed of a slick plastic material;
   a belt drive drivingly engaged with the conveyor belt;
   a bearing element positioned to bear against the article-conveying surface along a section of the belt-conveying path, the bearing element including a bearing surface comprising an oxidizable metal contacting the article-conveying surface of the conveyor belt, wherein oxidizable metal is transferred from the bearing surface to the article-conveying surface as the belt is driven past the bearing element to form a thin layer of oxidized metal on the article-conveying surface exhibiting increased friction.

8. A conveyor as in claim 7 wherein the bearing element is stationary.

9. A conveyor as in claim 7 wherein the oxidizable metal is aluminum.

10. A conveyor as in claim 7 further comprising weights attached to the bearing element to hold the bearing surface in contact with the article-conveying surface of the belt.

11. A conveyor as in claim 7 wherein the bearing element is disposed along the belt-conveying path at a position where articles are not conveyed.

12. A method for forming a thin layer of a preselected material on an article-conveying surface of a conveyor belt, comprising:
   positioning a transfer element including a preselected material proximate an article-conveying surface of a conveyor belt along a section of a belt-conveying path;
   causing the article-conveying surface of the conveyor belt and the preselected material to rub; and
   transferring the preselected material from the transfer element to the article-conveying surface of the conveyor belt by the rubbing of the article-conveying surface of the conveyor belt against the preselected material to form on the article-conveying surface of the conveyor belt a thin layer of the preselected material exhibiting surface characteristics different from the surface characteristics of the article-conveying surface of the conveyor belt.

13. The method of claim 12 further comprising replenishing the preselected material as it is depleted from the transfer element.

14. A method for forming a thin layer of a preselected material on a surface of a conveyor belt, comprising:
   positioning a transfer element including a preselected material proximate a surface of a conveyor belt along a section of a belt-conveying path;
   causing the conveyor belt and the preselected material to rub; and
   transferring the preselected material from the transfer element to the surface of the conveyor belt by the rubbing of the surface of the conveyor belt against the preselected material to form on the surface of the conveyor belt a thin layer of the preselected material exhibiting surface characteristics different from the surface characteristics of the surface of the conveyor belt;
   wherein the preselected material is a metal.

15. The method of claim 14 wherein the metal is an oxidizable metal.

16. A conveyor following a conveying path, comprising:

a conveyor belt having an article-conveying belt surface;

a belt drive drivingly engaged with the conveyor belt;

a transfer element disposed along a section of the conveying path proximate the article-conveying belt surface, the transfer element including a preselected material put in contact with the article-conveying belt surface and rubbed onto the article-conveying belt surface as a surface layer as the conveyor belt is driven past the transfer element.

17. A conveyor as in claim 16, wherein the transfer element includes a reservoir for the preselected material.

18. A conveyor as in claim 17, where in the reservoir is replenishable.

19. A conveyor as in claim 16, wherein the transfer element includes a dispenser for applying the preselected material to the belt surface.

20. A conveyor following a conveying path, comprising:

a conveyor belt having a belt surface;

a belt drive drivingly engaged with the conveyor belt;

a transfer element disposed along a section of the conveying path proximate the belt surface, the transfer element including a preselected material put in contact with the belt surface and transferred to the belt surface as a surface layer as the conveyor belt is driven past the transfer element;

wherein the transfer element includes a bearing surface in contact with the belt surface, wherein the bearing surface is made of the preselected material.

21. A conveyor for transporting articles along a carryway portion of a belt-conveying path, comprising:

a conveyor belt having a belt surface;

a belt drive drivingly engaged with the conveyor belt;

a transfer element including a reservoir for storing a supply of preselected material and a dispenser for dispensing the preselected material, wherein the transfer element is disposed proximate the belt surface along a section of the belt-conveying path so that as the conveyor belt is driven past the transfer element the preselected material is rubbed and thereby transferred from the dispenser as a layer coating generally the entire belt surface.

22. A method for forming a thin layer of a preselected material on an article-conveying surface of a conveyor belt, comprising:

providing a preselected material on a surface of a transfer element;

putting the surface of the transfer element including the preselected material in contact with the article-conveying surface of a conveyor belt; and transferring the preselected material from the transfer element as a thin layer atop the article-conveying surface of the belt.

23. The method of claim 22, wherein the transfer element is an article conveyed on the article-conveying surface of the belt.

24. The method of claim 23, comprising moving the article past a source of the preselected material to apply the preselected material to an underside of the article before the article is conveyed on the article-conveying surface of the belt.

25. The method of claim 22 wherein the transfer element is a plate made of the preselected material and disposed in rubbing contact with the article-conveying surface of the belt.

* * * * *